United States Patent
Wang et al.

(10) Patent No.: US 8,325,655 B2
(45) Date of Patent: Dec. 4, 2012

(54) MULTI-CARRIER HSDPA CHANNEL ESTABLISHING METHOD AND THE MULTI-CARRIER DOWNLINK PACKET DATA TRANSMITTING METHOD

(75) Inventors: Ying-min Wang, Shanghai (CN); Guiliang Yang, Shanghai (CN); Shaohui Sun, Shanghai (CN)

(73) Assignee: Shanghai Ultimate Power Communications Technology Co., Ltd., Shanghai (CN)

( * ) Notice: Subject to any disclaimer, the term of this patent is extended or adjusted under 35 U.S.C. 154(b) by 441 days.

(21) Appl. No.: 11/988,341

(22) PCT Filed: Jun. 29, 2006

(86) PCT No.: PCT/CN2006/001504
§ 371 (c)(1),
(2), (4) Date: Jan. 4, 2008

(87) PCT Pub. No.: WO2007/003121
PCT Pub. Date: Jan. 11, 2007

(65) Prior Publication Data
US 2009/0028103 A1 Jan. 29, 2009

(30) Foreign Application Priority Data

Jul. 4, 2005 (CN) .......................... 2005 1 0080642

(51) Int. Cl.
*H04W 72/04* (2009.01)
(52) U.S. Cl. ......... 370/329; 370/330; 370/343; 370/347
(58) Field of Classification Search .................. 370/310, 370/328, 329, 343, 347
See application file for complete search history.

(56) References Cited

U.S. PATENT DOCUMENTS

| | | | | |
|---|---|---|---|---|
| 2004/0063437 | A1* | 4/2004 | Braun et al. | 455/450 |
| 2005/0099989 | A1* | 5/2005 | Rudolf et al. | 370/347 |

(Continued)

FOREIGN PATENT DOCUMENTS

CN 1466286 1/2004
(Continued)

OTHER PUBLICATIONS

Zhifeng M A., et al; "Analysis on the multi-carrier-frequency characteristic in the TD-SCDMA system", third issue, Mobile Communication, Mar. 2005, 3 pages (with English Abstract).

*Primary Examiner* — Hassan Kizou
*Assistant Examiner* — Siming Liu
(74) *Attorney, Agent, or Firm* — Fulbright & Jaworski L.L.P.

(57) ABSTRACT

A method for establishing a multi-carrier HSDPA channel and method for transmitting multi-carrier downlink packet data are provided. The method for establishing a multi-carrier HSDPA channel includes: A. determining number of HSDPA channel resources of a cell; B. selecting N carriers in the cell according to the number of channel resources determined in step A, wherein the N carriers form the HSDPA channel resources; C. allocating the HSDPA channel resources to be HS-DSCHs, uplink and downlink control channels; D. allocating, by a network, an HS-DSCH to be used by a user terminal, one or more HS-SCCHs and one or more mate HS-SICHs to be monitored by the user terminal, when the user terminal initiates an HSDPA request and the request is allowed. The method may be applied to multi-carrier downlink packet data transmission, to enhance peak transmission rate of user packets, optimize the resources, thereby improving system throughput.

6 Claims, 2 Drawing Sheets

U.S. PATENT DOCUMENTS

| | | | |
|---|---|---|---|
| 2005/0233754 A1* | 10/2005 | Beale | 455/452.2 |
| 2005/0250502 A1* | 11/2005 | Laroia et al. | 455/447 |
| 2006/0153128 A1* | 7/2006 | Frederiksen et al. | 370/329 |

FOREIGN PATENT DOCUMENTS

| | | |
|---|---|---|
| CN | 1568032 | 1/2005 |
| CN | 1750703 | 3/2006 |
| EP | 1 549 088 | 6/2005 |
| WO | WO-03005754 | 1/2003 |
| WO | WO-2005/032194 | 4/2005 |

* cited by examiner

MULTI-CARRIER HSDPA CHANNEL ESTABLISHING METHOD AND THE MULTI-CARRIER DOWNLINK PACKET DATA TRANSMITTING METHOD

FIELD OF THE INVENTION

The invention relates to the field of communications, and in particular, to a method for establishing a multi-carrier High Speed Downlink Packet Access (HSDPA) channel and a method for transmitting multi-carrier downlink packet data.

BACKGROUND OF THE INVENTION

The most important capability of a Third Generation (3G) system is the capability of supporting high speed mobile packet services. Wide Code Division Multiple Access Release 99 (WCDMA R99) may provide a data rate up to 2 Mbps peak, which is sufficient for most existing packet services. For many data services with higher traffic and delay requirements, such as video, stream media and downloading services, however, the system is required to provide a higher transmission rate and a shorter delay.

Third Generation Partnership Project Release 5 (3GPP R5) introduces a High Speed Downlink Packet Access (HSDPA) technology, which not only supports high speed asymmetrical data services, but also may minimize the cost of the operators while improving the network capacity. HSDPA provides a stable approach for evolution of Universal Mobile Telecommunications System (UMTS) which has a higher data transmission rate and a higher capacity. With a full reference to the general idea and experiences of CDMA 2001X EV-DO, the HSDPA technology presented in R5 adds a new High Speed Downlink Shared Channel (HS-DSCH), to enable the centralized utilization of resources, such as transmission power, pseudo-noise (PN) code, as well as the dynamic allocation of the resources according to the practical condition of users, thereby the availability of resources may be improved.

During the transmission of single-carrier downlink packet data according to Release 5 specifications, HSDPA traffic channels and control channels are established by the following steps of: a1, determining channel resources required by HSDPA; a2, finding channel resources satisfying a condition of a cell; a3, allocating these channel resources for HSDPA to be traffic channel, e.g. HS-DSCH, as well as uplink and downlink control channels (High Speed Shared Information Channel, HS-SICH, and High Speed Shared Control Channel, HS-SCCH). The minimum unit of a channel resource is the combination of timeslot resource and code channel resource. When accessing a network, a user terminal obtains the resource information of its traffic channels as well as uplink and downlink control channels from the network. During data transmission, the network sends, via an HS-SCCH, control information required by the user terminal for receipt of packet data, schedules packet data according to data transmission answer acknowledge messages fed back by an HS-SICH and sends the packet data via the HS-DSCH. In this way, the user terminal is enabled to receive the packet data transmitted via the HS-DSCH according to the control information transmitted via the HS-SCCH.

During the above described downlink data transmission, the traffic channel and the control channels are borne over one carrier. As a result, the peak rate for transmitting data by use of HSDPA is limited by the channels, particularly when the carrier has limited HSDPA resources.

How to improve the peak transmission capacity in data transmission? In the prior art, a higher-order modulation is generally applied to a transmission signal, or the Multiple In Multiple Out (MIMO) or Orthogonal Frequency Division Multiplexing (OFDM) technology may be used, so as to enhance the HSDPA data transmission rate. However, for HSDPA in which the power of the transmission signal is limited, the application of the higher-order modulation may reduce the coverage scope of the higher-order-modulated signal. Moreover, the higher-order-modulated signal generally imposes higher requirements on devices, such as a power amplifier and a signal processor. Furthermore, for new physical layer technologies such as MIMO or OFDM, this technology is not matured currently. As a result, using this technology may result in a long developing period, a high cost and a high risk, and therefore is not the best choice for enhancement of peak transmission capability in data transmission at present.

In other words, with the existing downlink packet data transmission methods, it is difficult to further improve the peak transmission rate of user packet data. The applicant suggests employing multi-carrier HSDPA technology to enhance the transmission capability of packet data traffic. Whereas the current R5 specifications employ the single-carrier transmission of HSDPA, in which the channel establishment for control channels (HS-SCCH, HS-SICH) and traffic channel (HS-DSCH) is relatively simple, which does not meet the requirements of multi-carrier transmission of HSDPA.

SUMMARY OF THE INVENTION

An object of the invention is to provide a method for establishing a multi-carrier HSDPA channel, to solve a problem in the prior art that single-carrier HSDPA takes into consideration only the transmission control of single carrier and therefore can not meet the control requirements of multi-carrier HSDPA.

Another object of the invention is to provide a method for transmitting multi-carrier downlink packet data, to solve a problem that it is difficult to improve peak transmission rate of user packet data in the prior art.

In view of the above, the invention provides a method for establishing a multi-carrier HSDPA channel, which includes: A. determining number of HSDPA channel resources required by a cell; B. selecting N carriers in the cell according to the number of channel resources determined in step A, wherein the N carriers form HSDPA channel resources of the cell; C. allocating the HSDPA channel resources of the cell to be High Speed Downlink Shared Channels (HS-DSCHs), and uplink and downlink control channels; D. allocating, by a network for a user terminal, an HS-DSCH to be used by the user terminal, a High Speed Shared Control Channel (HS-SCCH) and a mate High Speed Shared Information Channel (HS-SICH) thereof to be monitored by the user terminal, when the user terminal initiates an HSDPA request and the request is allowed.

The step B may include: selecting N carriers with good channel condition from all M carriers in the cell, and selecting a part or all of leisure resources from the N carriers to form the HSDPA channel resources of the cell, wherein number of the HSDPA channel resources, i.e. channel resources which can be deployed to HSDPA application, is greater than or equal to the number of channel resources determined in step A, $1 \leq N \leq M$.

In step C, S carriers with good channel condition are selected from the HSDPA channel resources of the cell, and a part or all of leisure resources are selected from the S carriers to form the HS-DSCHs of the cell, wherein 1≦S≦N.

The good channel condition indicates that there are many leisure carrier resources, or the good channel condition is determined by number of carrier resources and interference.

Carrier resources with good channel condition for the user terminal may be selected from the HS-DSCHs allocated in step C, according to channel condition reported by the user, and be allocated to form the HS-DSCH to be used by the user terminal.

A method for transmitting multi-carrier downlink packet data is provided, which includes:

(1) establishing channels, which includes;
   A. determining number of HSDPA channel resources required by a cell;
   B. selecting N carriers in the cell according to the number of channel resources determined in step A, wherein the N carriers form HSDPA channel resources of the cell;
   C. allocating the HSDPA channel resources of the cell to be High Speed Downlink Shared Channels (HS-DSCHs), and uplink and downlink control channels;
   D. allocating, by a network for a user terminal, an HS-DSCH to be used by the user terminal, one or more High Speed Shared Control Channels (HS-SCCHs) and one or more mate High Speed Shared Information Channels (HS-SICHs) thereof to be monitored by the user terminal, when the user terminal initiates an HSDPA request and the request is allowed;

(2) during data transmission, selecting, by the network, a user terminal to be served next and channel resources and transmission format to be used, according to data transmission answer acknowledge messages and the channel quality indications of user terminals reported by each of the user terminals via an uplink control channel, and sending control information via a downlink control channel; and (3) transmitting data by the network via the HS-DSCH.

A radio network controller is also provided, for establishing a multi-carrier HSDPA channel. The wireless network controller includes: a first calculation unit, adapted for calculating number of HSDPA channel resources of a cell; a selection unit, adapted for selecting N carriers in the cell, in which the N carriers forms the HSDPA channel resources of the cell; a cell channel allocation unit, including a High Speed Downlink Shared Channel (HS-DSCH) allocation unit for allocating an HS-DSCH, and an uplink and downlink control channel allocation unit for allocating uplink and downlink control channels; a user traffic channel allocation unit, by which the network allocates an HS-DSCH to be used by a user terminal as well as one or more High Speed Shared Control Channels (HS-SCCHs) and one or more mate High Speed Shared Information Channels (HS-SICHs) thereof to be monitored by the user terminal, when the user terminal initiates an HSDPA request and the request is allowed.

The invention has the following advantages over the prior art:

In the method for establishing a multi-carrier HSDPA channel according to the invention, resources of multiple carriers are allocated in a centralized manner, thereby the availability efficiency of resources is improved. In addition, the channel resources over multiple carriers may be bound together, thereby providing a more flexible allocation manner, so that the packet data can be transmitted with a higher rate and a higher throughput.

In the method for transmitting multi-carrier downlink packet data according to the invention, channel resources for data transmission are increased to enhance the peak transmission rate of user packet data, which provides a good realizability.

DETAILED DESCRIPTION OF THE EMBODIMENTS

Embodiments of the invention will be described below in conjunction with the drawings.

Figure 1:
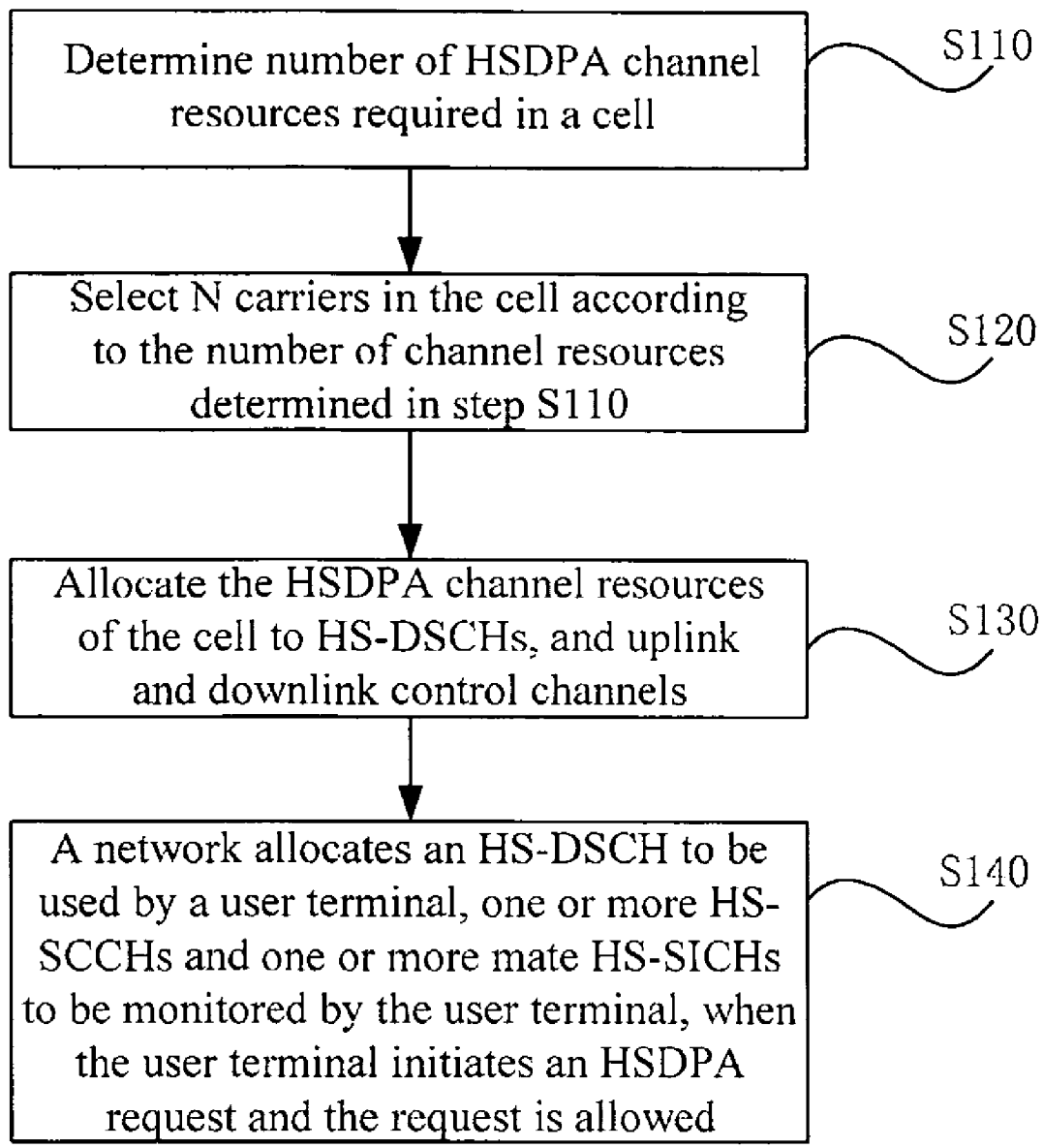
FIG. 1 is a flow chart illustrating a method for establishing a multi-carrier HSDPA channel according to the invention.

FIG. 1 shows a flow chart illustrating a method for establishing a multi-carrier High Speed Downlink Packet Access (HSDPA) channel according to the invention. As shown in FIG. 1, the method includes the steps of:

S110, determining number of HSDPA channel resources required by a cell;

S120, selecting N carriers in the cell according to the number of channel resources determined in step S110;

S130, allocating the HSDPA channel resources of the cell to be High Speed Downlink Shared Channels (HS-DSCHs), and uplink and downlink control channels;

S140, allocating, by a network for a user terminal, an HS-DSCH to be used by the user terminal, one or more High Speed Shared Control Channels (HS-SCCHs) and one or more mate High Speed Shared Information Channels (HS-SICHs) thereof to be monitored by the user terminal, when the user terminal initiates an HSDPA request and the request is allowed.

For single-carrier downlink packet data transmission, the channel resources of a cell include time slots and code channels. For multi-carrier downlink packet data transmission, if a resource allocation solution in which all HSDPA channels of a user are allocated over one carrier is supported, the flexibility of the resources, as well as the data transmission rate, may be limited. To this end, a method for establishing a HSDPA channel is provided according to the invention.

Each step of the method mentioned above will be described below.

S110, Determining Number of HSDPA Channel Resources Required in a Cell

A1. A radio network controller (RNC) may pre-judge whether a cell needs HSDPA services currently. The RNC may determine whether the cell needs HSDPA services first according to the service load of the cell, interference from an adjacent cell, and service types required by the cell, etc. A triggering condition for providing HSDPA services to the cell is set mainly according the particular conditions of each operator. For example, when a user terminal initiates a certain-level transmission rate request, the RNC triggers the function of providing HSDPA services to the cell. For another example, when the number of HSDPA capable user terminals in the cell reaches a predefined number, the RNC triggers the function of providing HSDPA services to the cell. Assume the conditions for triggering to provide HSDPA services to a cell include: (1) when the number of user terminals accessing the cell reaches 10, (2) when the service transmission amount to be transmitted, requested by the user terminals, is greater than a threshold. Currently there are 15 user terminals in the cell, in which 12 user terminals are HSDPA capable. When the service transmission amount to be transmitted, requested by the user terminals to a network, is greater than its threshold, the network triggers to provide HSDPA services to the cell.

Generally RNC needs not to judge, instead, it may directly provide HSDPA services to the cell supporting HSDPA functions, because HSDPA has the advantages such as a rapid downlink data transmission rate, and a higher resource availability, etc.

A2. The number of HSDPA channel resources in the cell is determined.

Each operator may set its number of HSDPA channel resources in the cell according to its own conditions. An operator may set a fixed value Y for the number of HSDPA channel resources in the cell. Therefore, the number of HSDPA channel resources in the cell provided by the operator is the fixed value Y. The operator may also set the number of HSDPA channel resources in each cell according to the particular conditions of each cell. For example, when determining the number of HSDPA channel resources, some factors, such as system capacity, load of a cell, transmission rate required by user terminals, throughput of data transmission, are generally taken into consideration. The more the HSDPA channel resources are, the more beneficial for subsequent downlink packet data transmission it is. However, in addition to the HSDPA services, a cell is required to bear many other services, which also occupy channel resources. Therefore, the operator is further required to take into consideration the service types provided by the communication system as well as the resources occupied by the various types of services, when determining the number of HSDPA channel resources in the cell. The RNC may form a formula by using the above factors, to calculate the number of HSDPA channel resources in each cell. Of course, in the invention the number of HSDPA channel resources in a cell may also be determined with reference to the single-carrier downlink packet data transmission.

S120, Selecting N Carriers in the Cell According to the Number of Channel Resources Determined in Step S110, to Form HSDPA Channel Resources of the Cell In the invention, N carriers with good channel condition are selected from all the M carriers of the cell, and a part or all of leisure resources selected from the N carriers form the HSDPA channel resources of the cell. The number of the HSDPA channel resources is greater than or equal to that of the channel resources required in the step S110, in which $1 \leq N \leq M$. The good channel condition indicates that there are many leisure carrier resources, or that there are many leisure carrier resources with small interference.

For example, the M carriers are sorted according to their channel conditions. First, a carrier with the best channel condition is selected to be one of the N carriers, and it is judged whether the number of channel resources of this carrier is greater than or equal to the number of channel resources required in step S110. If the number of channel resources of this carrier does not meet the requirement of the number of channel resources required in step S110, a carrier with a secondary best channel condition is selected to be one of the N carriers, and it is judged whether the sum of the number of channel resources of the carrier with the secondary best channel condition and that of the carrier with the best channel carrier is greater than or equal to the number of channel resources required in step S110, and so on, until N carriers are selected from the M carriers and the number of HSDPA channel resources formed by the leisure resources of the N carriers is greater than or equal to the number of channel resources required in step S110. The channel condition may be estimated by the number of remaining resources of a carrier. The more the remaining resources of a carrier are, the better the channel condition of the carrier is. The channel condition may also may estimated by interferences and remaining resources of a carrier. For example, the interferences may be quantized, the interferences and remaining resources of carriers may be weighed, and channel conditions may be quantized, to calculate the channel condition of each carrier. The greater the calculated value is, the better the channel condition of the carrier is.

N carriers supported by the user terminals are selected from all the M carriers of the cell, and a part or all of leisure resources selected from the N carriers form the HSDPA channel resources of the cell. The number of the HSDPA channel resources is greater than or equal to that of the channel resources required in the step S110, in which $1 \leq N \leq M$.

Therefore, all carriers supported by the user terminal are selected in the cell, and a part or all of the leisure resources are selected from the N carriers, so as to form the HSDPA channel resources of the cell. The number of the HSDPA channel resources is greater than or equal to that of the channel resources required in the step S110. That is, the number of the selected carriers and the positions of the carriers, the number of time slots allocated for each carrier and the positions of the time slots, as well as the number of code channels of each time slots and the positions of the code channels are determined. For a multi-carrier Time Division Duplex (TDD) system employing non-spread-spectrum or single code channel, resources are allocated in two dimensions, i.e. frequency and time slot. That is, the number of carriers and the positions of the carriers as well as the number of time slots allocated for each carrier and the positions of the time slots need to be determined.

In other words, step 120 is to determine the HSDPA channel resources of a cell, i.e. to determine the number of carriers and the position of each carrier, the number of time slots allocated for each carrier and the positions of the time slots, as well as the number of code channels of each time slots and the positions of the code channels.

S130, Allocating the HSDPA Channel Resources of the Cell to be HS-DSCHs, and Uplink and Downlink Control Channels The RNC manages the HSDPA channel resources of the cell in a centralized manner, assigns HS-DSCHs and one or more pairs of uplink and downlink control channels. An HS-DSCH is a high speed downlink shared data channel, and may be shared by different user terminals by time division multiplexing and code division multiplexing. HS-DSCH shared control channel (HS-SCCH, also referred to as downlink control channel) is a downlink control channel dedicated to HSDPA, and is a physical channel for bearing a control channel. In other words, the receipt, by a user terminal, of data transmitted over the HS-DSCH has to be done with the cooperation of the HS-SCCH. HS-DSCH shared information channel (HS-SICH, also referred to as uplink control channel) is a uplink control channel dedicated to HSDPA, and is also a physical channel for feeding back uplink information, including answer/non-answer acknowledgement and channel quality indication. The downlink control channel and uplink control channel are usually used in a pair. There may be one or more pairs of downlink and uplink control channels. Each cell is typically allocated a plurality of pairs of downlink and uplink control channels.

The RNC may preset the channel resources required by the HS-DSCHs according to the service demand, and the interference condition of the cell, etc. The number of channel resources required by the HS-DSCHs is less than the number of DSPDA channel resources of the cell.

The RNC may select, from the N carriers of the cell, S ($1 \leq S \leq N$) carriers, for example, with smaller interference and more leisure resources, and allocate a part or all of the leisure resources selected from the S carriers to form the HS-DSCHs. The number of channel resources allocated for the HS-DSCHs is greater than or equal to the number of the preset channel resources required by the HS-DSCHs.

For example, the N carriers are sorted according to their channel conditions. First, a carrier with the best channel condition is selected to be one of the S carriers, and it is judged whether the number of channel resources of this carrier is greater than or equal to the number of the preset chatmel resources required by the HS-DSCHs. If the number of chmmel resources of this carrier does not meet the requirement of the number of the preset channel resources required by the HS-DSCHs, a carrier with a secondary best channel condition is selected from the N carriers to be one of the S carriers, and it is judged whether the sum of the number of channel resources of the carrier with the secondary best channel condition and that of the carrier with the best chmmel carrier is greater than or equal to the number of the preset channel resources required by the HS-DSCHs, and so on, until S carriers are selected from the N carriers and the number of HSDPA channel resources formed by the leisure resources of the S carriers is greater than or equal to the number of the preset channel resources required by the HS-DSCHs. The chmmel condition may be estimated by the number of remaining resources of a carrier. The more the remaining resources of a carrier are, the better the channel condition of the carrier is. The channel condition may also be estimated by interferences and remaining resources of a carrier. For example, the interferences may be quantized, the interferences and remaining resources of carriers may be weighed differently, and channel conditions may be quantized, to calculate the channel condition of each carrier. The greater the calculated value is, the better the channel condition of the carrier is.

The RNC may select the number and frequencies of carriers in consideration of the channel conditions of user terminals accessing the cell. For example, suppose there are 6 carriers (A, B, C, D, E, F) in a cell and only 3 of the carriers are supported by the user terminals accessing the cell, the channel conditions of the user terminals accessing the cell are different from each other, some user terminals have better channel conditions on carrier A, some have better channel conditions on carrier B, while some have better channel conditions on carrier C. As a result, the cell selects all the carriers supported by the user terminals, and then allocates a part or all of the leisure resources of the carriers to form HS-DSCHs.

In other words, allocation of HS-DSCHs is mainly to determine the channel resources of the HS-DSCHs, i.e. to determine the number of carriers and the position of each carrier, the number of time slots allocated for each carrier and the positions of the time slots, as well as the number of code channels of each time slots and the positions of the code channels. For a multi-carrier TDD system employing non-spread-spectrum or single code channel, resources are allocated in two dimensions, i.e. frequency and time slot. That is, the number of carriers and the positions of the carriers as well as the number of time slots allocated for each carrier and the positions of the time slots need to be determined.

There may be a plurality of pairs of HS-SCCHs and HS-SICHs, while the channel resources of each pair of HS-SCCH and HS-SICH are allocated over a same carrier.

S140, Allocating, by a Network for a User Terminal, an HS-DSCH to be Used by the User Terminal, one or More HS-SCCHs and one or More Mate HS-SICHs Thereof to be Monitored by the User Terminal, when the User Terminal Initiates an HSDPA Request and the Request is Allowed When a user terminal initiates an HSDPA request and the request is allowed, the network is required to allocate an HS-DSCH to be used by the user terminal, one or more HS-SCCHs and one or more mate HS-SICHs thereof to be monitored by the user terminal. The user terminal reports its channel condition after connecting to the network. The network allocates, by using a scheduling algorithm, channel resources for the HS-DSCH(s) of the user terminal according to the channel condition. The allocated channel resources are a part or all of the channel resources allocated for the HS-DSCH in step 130. Generally, the network selects channel resources with good channel conditions from the channel resources for the HS-DSCHs allocated in step S130, and allocates the selected channel resources with good channel conditions to form the HS-DSCH to be used by this user terminal. Channel resources of one user terminal are allocated over one carrier as much as possible. Only when the channel resources on one carrier can not meet the requirements, the HS-DSCH resources of other carriers are allocated to the user terminal. HARQ (Hybrid Automatic Repeat Request), for example, HARQ Type I, HARQ Type II, and HARQ Type III, may provide an accurate rate adjustment based on channel conditions. Therefore, the network chooses an appropriate rate adjustment according to the scheduling algorithm, to determine the channel resources of the HS-DSCH used by the user terminal.

To simplify the packet data transmission of user terminals, in the invention all HS-SCCHs and all HS-SICHs of one user terminal may be selected to be over one carrier as much as possible. When all HS-SCCHs and all HS-SICHs of one user terminal are over one carrier, a pair of uplink and downlink associated channels may be allocated to the user terminal to enhance the availability efficiency of resources.

The uplink and downlink control channels are shared channels, while the uplink and downlink associated channels are dedicated channels. The uplink and downlink associated channels are used to transmit high layer control signaling, high layer answer acknowledge messages of the user terminal and power control and synchronization control messages for initializing HS-SCCHs and HS-SICHs. The user terminal obtains, via the uplink and downlink associated channels, high layer signaling transmitted from the network as well as the power and synchronization data of the uplink and downlink control channels, so that the user terminal is able to set the initial power of the selected uplink and downlink control channels properly and controls the synchronization, thereby the user terminal and the network can communicate with each other by using the selected uplink and downlink control channels. The network may notify, through the HS-SCCH, the user terminal of the information that the network sends data blocks to the user terminal, including the time slots, channels, modulation types, sizes of the data blocks, redundancy version number, and retransmission identifier, etc. The user terminal can feed, through the HS-SICH, answer acknowledge messages of transmitted data as well as the channel condition of the user terminal back to the network.

Figure 2:
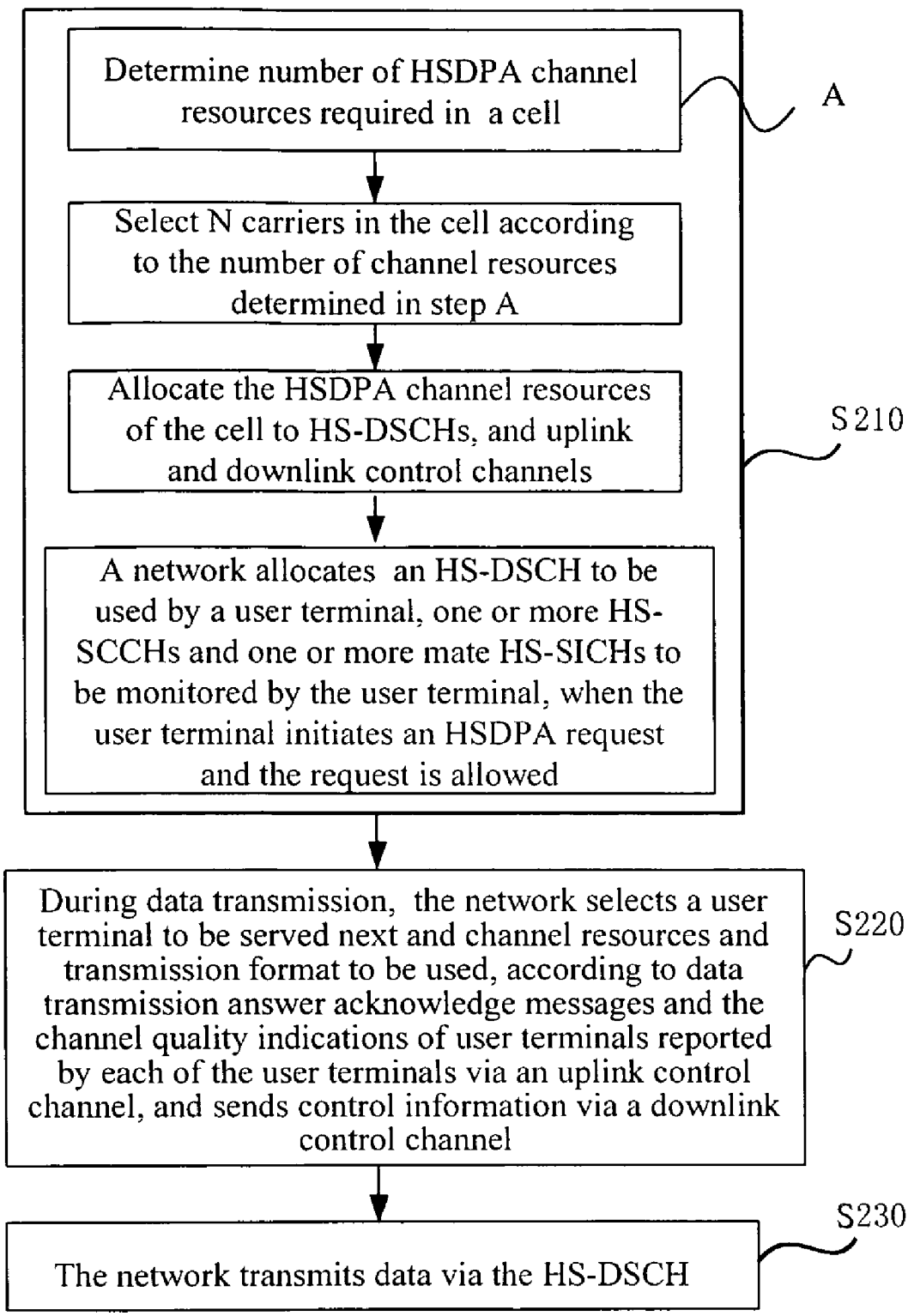
FIG. 2 is a flow chart illustrating a method for transmitting multi-carrier downlink packet data according to the invention.

FIG. 2 shows a flow chart illustrating a method for transmitting multi-carrier downlink packet data according to the invention, based on the channel establishing process described above. The method for transmitting multi-carrier downlink packet data includes:

S210, Establishing Channels

A. The number of HSDPA channel resources in the cell is determined. Each operator may set the number of HSDPA channel resources in the cell according to its own conditions.

An operator may set a fixed value Y for the number of HSDPA channel resources in the cell. Therefore, the number of HSDPA channel resources in the cell provided by the operator is the fixed value Y. The operator may also set the number of HSDPA channel resources in each cell according to the particular conditions of each cell.

B. N carriers are selected in the cell according to the number of channel resources required in step A. The N carriers form the HSDPA channel resources of the cell. Particularly, N carriers with good channel condition may be selected from all the M carriers of the cell, and a part or all of leisure resources selected from the N carriers may form the HSDPA channel resources of the cell. The number of the HSDPA channel resources is greater than or equal to that of the channel resources required in the step A, in which $1 \leq N \leq M$. The good channel condition indicates that there are many leisure carrier resources, or that there are many leisure carrier resources with small interference.

Alternatively, the step B may include steps of selecting N carriers supported by the user terminal from all the M carriers of the cell, and selecting a part or all of leisure resources selected from the N carriers may form the HSDPA channel resources of the cell. The number of the HSDPA channel resources is greater than or equal to that of the channel resources required in the step A, in which $1 \leq N \leq M$.

C. The HSDPA channel resources of the cell are allocated to be HS-DSCHs and uplink and downlink control channels. In step C, S carriers with good channel conditions are selected from the HSDPA channel resources of the cell, a part or all of the leisure resources are selected from the S carriers and allocated to form the HS-DSCHs of the cell, in which $1 \leq S \leq N$. The good channel condition indicates that there are many leisure carrier resources, or that there are many leisure carrier resources with small interference. In step C, there may be a plurality of pairs of uplink and downlink control channels, each pair of uplink and downlink control channels are over one carrier.

D. When a user terminal initiates an HSDPA request and the request is allowed, the network allocates an HS-DSCH to be used by the user terminal, one or more HS-SCCHs and one or more mate HS-SICHs thereof to be monitored by the user terminal. The network selects carrier resources with good channel conditions for the user terminal from the HS-DSCHs allocate in step C, and allocates the selected carrier resources to form the HS-DSCH to be used by the user terminal. Channel resources of one user terminal are allocated over one carrier as much as possible. If channel resources of one user terminal are not over one carrier, the channel resources for HS-DSCH over different carriers are bound together and scheduled to be used.

S220, during data transmission, the network selects a user terminal to be served next and channel resources and transmission format to be used, according to data transmission answer acknowledge messages and the channel quality indications of the user terminals reported by each of the user terminals via the uplink control channel, and sends control information via the downlink control channel.

At the beginning of the establishment of packet data transmission between a user terminal and the network, before sending data to the user terminal the first time, the network sends control information via the downlink control channel. The user terminal receives the control information, and receives data via the HS-DSCH. During the subsequent packet data transmission, the network may send data by using information fed back by the user terminal via the uplink control channel. Generally, the user terminal measures the channel and feeds information, including the measurement result, etc. back to the network via the uplink control channel. The channel quality indication includes the size of transmission data block and modulation format proposed by the user terminal, etc.

The network selects a user terminal to be served next as well as channel resources and transmission format to be used according to the channel quality indications. Each time when transmitting data, the network selects, by using a scheduling algorithm, a user terminal to be served, according to data transmission answer acknowledge messages and channel quality indications of the user terminals fed back by each user terminal via an uplink control channel, and decides the channel resources and transmission format to be used.

The network sends control information to the user terminal via the downlink control channel, so that the user terminal receives data transmitted via the HS-DSCH according to the control information.

S230, the Network Sends Data Via the HS-DSCH.

The user terminal receives data transmitted via the HS-DSCH according to the control information transmitted via the downlink control channel. The network sends packet data via the HS-DSCH. When the data received by the user terminal have errors and the maximum number of retransmissions is not exceeded, the network is notified via the HS-SICH to retransmit the data. If the received data has errors and the maximum number of retransmissions is exceeded, the data is discarded, and the network is notified to transmit new data. If the received data has no error, the network may send new data. The data transmission answer acknowledge message and channel quality indication of the user terminal are transmitted via the HS-SICH, so that the network may decide the next action, i.e. retransmitting data or transmitting new data, according to the data transmission answer acknowledge message and channel quality indication of the user terminal fed back via the HS-SICH.

In the invention, a multi-carrier and HSDPA combined method is employed, to enhance the peak transmission rate of packet data of a single user terminal. In addition, resources of multiple carriers may be allocated in a centralized manner, to optimize the resources, thereby the availability efficiency of resources, as well as the throughput of system, may be improved.

The invention further provides a radio network controller (RNC), for establishing a multi-carrier HSDPA channel. The radio network controller includes:

a first calculation unit, adapted for calculating number of HSDPA channel resources of a cell;

a selection unit, adapted for selecting N carriers in the cell, in which the N carriers forms the HSDPA channel resources of the cell;

a cell channel allocation unit, including an HS-DSCH channel allocation unit for allocating an HS-DSCH, and an uplink and downlink control channel allocation unit for allocating uplink and downlink control channels;

a user traffic channel allocation unit, by which the network allocates an HS-DSCH to be used by a user terminal as well as one or more HS-SCCHs and one or more mate HS-SICHs thereof to be monitored by the user terminal, when the user terminal initiates an HSDPA request and the request is allowed.

While several embodiments of the invention have been described above, the invention is not limited to these. Any modification and variation recognized by a person skilled in the art are intended to be covered within the protection scope of the invention.

What is claimed is:

1. A method for establishing a multi-carrier High Speed Downlink Packet Access (HSDPA) channel, comprising:
   A. determining number of HSDPA channel resources of a cell;
   B. selecting N carriers in the cell according to the number of channel resources determined in step A, wherein the N carriers form HSDPA channel resources of the cell;
   C. allocating the HSDPA channel resources of the cell to be High Speed Downlink Shared Channels (HS-DSCHs), and uplink and downlink control channels; and
   D. allocating, by a network for a user terminal, an HS-DSCH to be used by the user terminal, one or more High Speed Shared Control Channels (HS-SCCHs) and one or more corresponding High Speed Shared Information Channels (HS-SICHs) thereof to be monitored by the user terminal, when the user terminal initiates an HSDPA request and the request is allowed, wherein HS-DSCH is allocated over more than one of the N carriers, wherein the HS-SCCHs and the HS-SICHs are allocated over one of the N carriers.

2. The method according to claim 1, wherein the step B comprises: selecting N carriers with most idle carrier resources from all M carriers in the cell, wherein the M represents the number of carriers allocated to the cell, and selecting a part or all of idle carrier resources from the N carriers to form the HSDPA channel resources of the cell, wherein number of the HSDPA channel resources of the cell is greater than or equal to the number of channel resources required by the cell determined in step A, $1<N\leq M$.

3. The method according to claim 1, wherein in step C, S carriers with most idle carrier resources are selected from the most idle carrier resources of the cell, and a part or all of idle carrier resources are selected from the S carriers to form the HS-DSCHs of the cell, wherein $1<S\leq N$.

4. The method according to claim 1, wherein carrier resources with most idle carrier resources for the user terminal are selected from the HS-DSCHs allocated in step C, according to channel condition reported by the user, and are allocated to form the HS-DSCH to be used by the user terminal.

5. The method according to claim 1, wherein in step D, HS-DSCH channel resources of one user terminal allocated over different carriers are bound together and scheduled to be used.

6. A method for transmitting multi-carrier downlink packet data, comprising:
   (1) establishing channels, comprising;
      A. determining number of High Speed Downlink Packet Access (HSDPA) channel resources of a cell;
      B. selecting N carriers in the cell according to the number of channel resources determined in step A, wherein the N carriers form HSDPA channel resources of the cell;
      C. allocating the HSDPA channel resources of the cell to be High Speed Downlink Shared Channels (HS-DSCHs), and uplink and downlink control channels; and
      D. allocating, by a network for a user terminal, an HS-DSCH to be used by the user terminal, one or more High Speed Shared Control Channels (HS-SCCHs) and one or more corresponding High Speed Shared Information Channels (HS-SICHs) thereof to be monitored by the user terminal, when the user terminal initiates an HSDPA request and the request is allowed, wherein the HS-DSCH is allocated over more than one of the N carriers, wherein the HS-SCCHs and the HS-SICHs are allocated over one of the N carriers;
   (2) during data transmission, selecting, by the network, a user terminal to be served next and channel resources and transmission format to be used, according to data transmission answer acknowledge messages and the channel quality indications of user terminals reported by each of the user terminals via an uplink control channel, and sending control information via a downlink control channel; and
   (3) transmitting data by the network via the HS-DSCH.

* * * * *